United States Patent [19]

Bardoll

[11] Patent Number: 4,616,674
[45] Date of Patent: Oct. 14, 1986

[54] 4/3-DIRECTIONAL CONTROL VALVE

[75] Inventor: Meinrad Bardoll, Gaggenau, Fed. Rep. of Germany

[73] Assignee: Dr.Ing. h.c.F. Porsche Aktiengesellschaft, Fed. Rep. of Germany

[21] Appl. No.: 646,250

[22] Filed: Aug. 31, 1984

[30] Foreign Application Priority Data

Sep. 1, 1983 [DE] Fed. Rep. of Germany ....... 3331582

[51] Int. Cl.⁴ ............................................. F15B 15/00
[52] U.S. Cl. .......................... 137/596.18; 137/596.16; 91/465
[58] Field of Search ................ 91/465, 461, 464, 436, 91/437; 137/596.14, 596.15, 596.16, 596.18, 625.66, 625.69

[56] References Cited

U.S. PATENT DOCUMENTS

| 2,366,127 | 12/1944 | Rappl | 91/465 |
| 2,637,303 | 5/1953 | Cintron | 137/596.18 |
| 2,637,341 | 5/1953 | Borst | 91/464 |
| 3,212,409 | 10/1965 | Mash | 91/464 |
| 3,870,073 | 3/1975 | Ruchser et al. | 137/596.16 |
| 4,259,986 | 4/1981 | Maucher et al. | 137/596.16 |

FOREIGN PATENT DOCUMENTS

| 2115054 | 10/1972 | Fed. Rep. of Germany | 137/596.18 |
| 2038615 | 8/1978 | Fed. Rep. of Germany | 137/596.16 |

Primary Examiner—Margaret A. Focarino
Assistant Examiner—Noah Kamen
Attorney, Agent, or Firm—Craig & Burns

[57] ABSTRACT

A 4/3-directional control valve with a tubularly shaped valve housing that includes along its longitudinal dimension a central return connection to a reservoir tank for hydraulic liquid, to the left and right of the return connection a working connection to the front and backside of a hydraulic piston disposed symmetrically thereto as well as a pump connection to a pump supplying a constant pressure; these hydraulic connections are adapted to be controlled by two oppositely operating control pistons having a coil spring disposed therebetween, whose end faces are adapted to be acted upon with pump pressure by electromagnetically actuated pilot valves; the volume of the hydraulic liquid which is displaced at one piston side during the left respective right movement of the hydraulic piston, reaches the other piston side by way of the two working connections.

6 Claims, 3 Drawing Figures

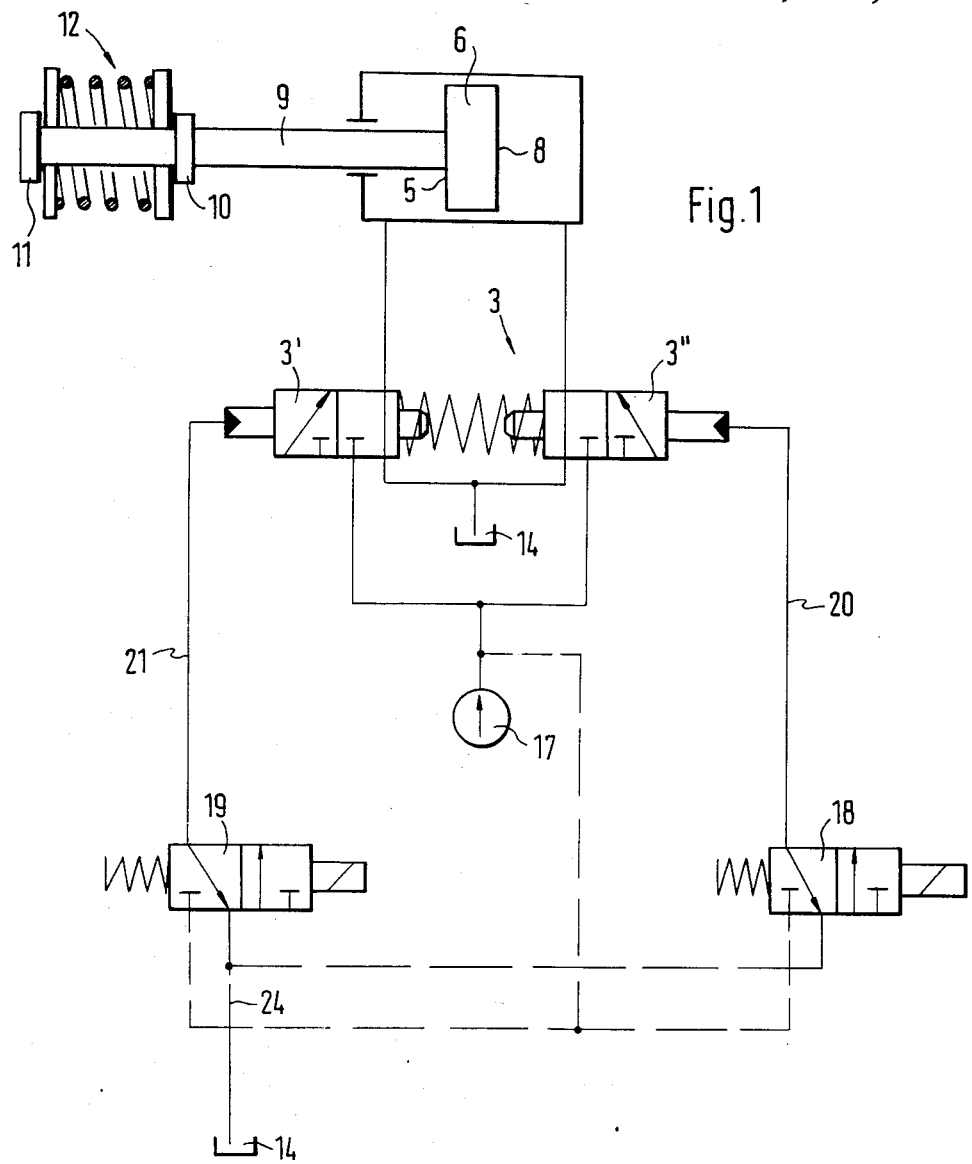
Fig.1
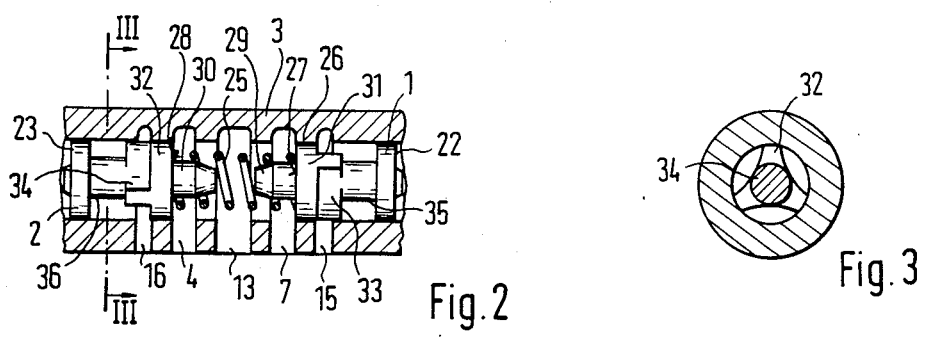
Fig.2
Fig.3

4/3-DIRECTIONAL CONTROL VALVE

FIELD OF THE INVENTION

The present invention relates to a 4/3-directional control valve for controlling the hydraulic piston of a hydraulic shifting arrangement, with a control piston held in its starting position by spring force, which is longitudinally guided in a tubularly shaped housing and controls pump connections to a feed pump and a return connection to a reservoir tank.

SUMMARY OF THE INVENTION

Such a 4/3-directional control valve, which connects with each other or closes off four line connections in three shifting positions in a predetermined manner, is described in the book "Oelhydraulik", F. and D. Findeisen, page 140, 3rd Ed., Springer-Publication 1978. The two working connections leading to the front and rear side of the hydraulic piston are closed off in the neutral shifting position; the pump connection is connected with the return connection and the hydraulic liquid flows off without pressure. In the two further shifting positions, one working connection is connected with the pump connection and the other working connection with the return connection and vice-versa for the right and left movement of the hydraulic piston. During the shifting from right to left movement, the hydraulic liquid on the front side of the hydraulic piston is displaced by way of the working connection and a return connection into the reservoir tank whereas at the same time an equally large quantity of hydraulic liquid is sucked-in out of the reservoir tank by way of the other working connection and is drawn to the backside of the hydraulic piston. A high flow resistance results therefrom which becomes noticeable in particular at low temperatures of the hydraulic liquid as a result of the high viscosity. This becomes disadvantageous in particular when the hydraulic piston is returned into the neutral starting position by spring force because in this case, in addition to the friction force at the hydraulic piston, also the force for the displacement of the hydraulic liquid has to be produced by the spring. A rapid shifting of the hydraulic piston is not possible under these circumstances.

It is the object of the present invention to provide a 4/3-directional control valve for the control of a hydraulic piston which during the shifting of the hydraulic piston from left to right movement and vice-versa opposes to the liquid displaced thereby an only low resistance so that the shifting can take place rapidly.

The underlying problems are solved according to the present invention in that the valve housing contains two oppositely operating control pistons and a coil spring disposed between their mutually opposite end faces whereas the other end faces of the control pistons are connected by way of pressure lines with pilot valves, and in that one working connection respectively one pump connection is coordinated to each of the two control pistons, and in that for both control pistons a common return connection is provided which is located approximately centrally between the working connections. Since the return connection is located approximately centrally in the valve housing and the two working connections are arranged to the left and right thereof, the liquid displaced from one piston side can flow through the one working connection directly into the other working connection and from there to the other side of the hydraulic piston without the need that the hydraulic liquid has to pass prior thereto through the lines to the reservoir tank, as is the case in the prior art 4/3-directional control valve. Since the flow resistance with the use of the 4/3-directional control valve in accordance with the present invention is very low, the hydraulic piston can be shifted very rapidly and is well suited for the automatic actuation of the speed or gear shifting of a motor vehicle. In order to return the one control piston rapidly and reliably into its neutral starting position, when the other control piston is acted upon by pressure, extensions are provided at the mutually facing end faces of the two control pistons which come into mutual abutment during each shifting movement and thus, in addition to the yielding connection by way of the coil spring, effect a direct rigid mechanical coupling of the control piston-shifting movements.

The control pistons are guided in the tubularly shaped housing whose walls, however, are interrupted by the line connections. It is assured by star-shaped guide members which are centered and held in the valve housing and surround with the hubs thereof cylindrical reduced portions of the control piston, that the control pistons receive a sufficient guidance also when passing over the line connection area.

BRIEF DESCRIPTION OF THE DRAWINGS

These and other objects, features and advantage of the present invention will become more apparent from the following description when taken in connection with the accompanying drawing which shows, for purposes of illustration only, one embodiment in accordance with the present invention and wherein:

FIG. 1 is a schematic view of a hydraulic shifting arrangement with a 4/3-directional control valve in accordance with the present invention;

FIG. 2 is a cross sectional view through the 4/3-directional control valve in accordance with the present invention; and FIG. 3 is a cross sectional view through a guide member for the control pistons, taken along line III—III of FIG. 2.

DETAILED DESCRIPTION OF THE PREFERRED EMBODIMENT

Referring now to the drawing wherein like reference numerals are used throughout the various views to designate like parts, the two partial sections 3' and 3" of a one-piece tubularly shaped valve housing generally designated by reference numeral 3 which contain the control pistons 1 and 2 (FIG. 2), are illustrated separately in order to be able to illustrate more clearly the hydraulic schematic diagram by means of customary symbols.

The left partial section 3' is connected by way of a working connection 4 and a hydraulic line with the front side 5 of a hydraulic piston 6 longitudinally guided in a hydraulic housing; the right partial section 3" is operatively connected by way of a working connection 7 and a hydraulic line with the backside 8 of the hydraulic piston 6. A shifting rod 9 is secured at the hydraulic piston 6, whose free end abuts with two abutments 10 and 11 on both sides of a springy return mechanism generally designated by reference numeral 12 which returns the hydraulic piston 6 deflected toward the left or the right, into the illustrated neutral starting position after removal of the pressure load.

The return connection 13 which is common for both control pistons 1 and 2 and leads to a reservoir tank 14 with hydraulic liquid, is arranged in the valve housing 3 centrally between the working connections 4. On the other sides of the working connections 4 and 7, two pump connections 15 and 16 are arranged symmetrically to the return connection 13 which are connected by way of pressure lines with a pump 17 supplying a constant pressure. The end faces 22 and 23 of the control pistons 1 and 2 are adapted to be acted upon with pressure by means of this pump 17 by way of electromagnetically actuated pilot valves 18 and 19 as well as lines 20 and 21. In the illustrated position the pilot valves 18 and 19 are de-energized; the end faces 22 and 23 of the control pistons 1 and 2 are connected with a common return line 24 leading to the reservoir tank 14 by way of pressureless lines and pilot valves 18 and 19.

If, for example, the right pilot valve 18 is now shifted by energization, then pump pressure is applied to the right control piston 1 so that it moves under prestressing of the coil spring 25 arranged between the control pistons 1 and 2 so far to the left until its control edge 26 releases the connection from the pump connection 15 to the working connection 7. The pump pressure can thus become effective on the backside 8 of the hydraulic piston 6 and displaces the same toward the left.

If the hydraulic piston 6 and the shifting rod 9 are now to be displaced toward the right, then the right pilot valve 18 is deenergized so that the pressure at the end face 22 of the right control piston 1 is reduced by way of the return line 24. At the same time the left pilot valve 19 is engaged and the end face 23 of the left control piston 2 is acted upon with pressure. The control piston 2 which is displaced thereby toward the right, opens up the connection from the pump connection 15 to the working connection 4 and thus applies the pump pressure against the front side 5 of the hydraulic piston 6. Simultaneously therewith it returns the right control piston 1 into its starting position by way of the coil spring 5.

During the right movement of the hydraulic piston 6 the hydraulic liquid present on its backside 8 is displaced to the front side 5 of the hydraulic piston 6 by way of the working connections 7 and 4 in operative communication with each other. Since the hydraulic liquid thus does not have to pass through the long lines to the reservoir tank 14 and back, but instead is displaced by way of a direct path from the one to the other side of the hydraulic piston, the shifting from right to left movement and vice-versa can take place very rapidly.

In order to further increase the shifting speed and shifting reliability, the end faces 27 and 28 of the control pistons 1 and 2 on the side of the spring 25 are provided with coaxial extensions 29 and 30. If one control piston passes from its neutral starting position into its working position, its extension comes into abutment at the extension of the other control piston and displaces the same back into its starting position. In this manner, in addition to the elastic coupling, a rigid mechanical connection of the two control pistons 1 and 2 is produced.

The control pistons 1 and 2 are longitudinally guided in the valve housing 3. However, since the walls of the valve housing 3 are interrupted several times within the area of the hydraulic connections, additionally star-shaped guide members 31 and 32 (FIGS. 2 and 3) are provided for the two control pistons 1 and 2 which are retained coaxially in the valve housing 3 and surround with central hubs 33 and 34 thereof the control pistons 1 and 2 at the reduced sections 35 and 36 thereof.

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A 4/3-directional control valve for the control of a hydraulic piston of a hydraulic shifting mechanism, comprising: control piston means biased by a coil spring in a nonactuating position, tubularly shaped housing means, said control piston means being longitudinally guided in said housing means, said housing means having working connections connected to the hydraulic piston, pump connections connected with a pump and a return connection connected with a reservoir tank, said control piston means including two oppositely operating control pistons guided within said valve housing means, said control pistons having first end forces facing one another and second end faces away from one another said spring disposed between said first end faces, said return connection having a port opening centrally within said housing said pump connections having port openings axially disposed on either side of said return port opening said pump connections having port openings disposed between said return opening and said pump openings said control piston means having surface means blocking communication between said working openings and said pump openings in said non actuating position while said working openings and said return opening communicate with one another wherein said hydraulic pistons can operate to pass fluid from one side of its piston to its other side via said working connectons and said working openings, means for acting on said second end faces to move said control piston means for locating said surface means to block communicating between one of said working port openings and said return port opening wherein said one of said working port openings communicates with one of said pump openings.

2. A directional control valve according to claim 1, further comprising extensions at each of the one end face of the two control pistons which are so arranged that the extension of one control piston comes into abutment at the extension of the other control piston during pressure actuation of the one control piston and pushes the other control piston back into its nonactuating position.

3. A directional control valve according to claim 2, further comprising star-shaped guide means for the longitudinal guidance of the control pistons, said guide means being centered and retained in the valve housing means and including hubs surrounding cylindrical reduced portions of the control pistons.

4. A directional control valve according to claim 1, further comprising star-shaped guide means for the longitudinal guidance of the control pistons, said guide means being centered and retained in the valve housing means and including hubs surrounding cylindrical reduced portions of the control pistons.

5. A directional control valve according to claim 1, wherein the hydraulic piston means has a bias means to position the piston means at a neutral point when neither working connection is in contact with the pressure coming from the pump.

6. A directional control valve according to claim 5, wherein the bias means, when positioning the piston it its neutral position, causes fluid to be pumped from one side of the piston through one connection means, past the common return into the other connection means and hence to the other side of the piston.

* * * * *